Nov. 12, 1963 H. H. R. NIEMANN 3,110,156
INSULATION OF CONTAINERS FOR THE STORAGE OF LIQUIDS WHICH BOIL AT ATMOSPHERIC OR SLIGHTLY SUPERATMOSPHERIC PRESSURE
Filed June 29, 1961
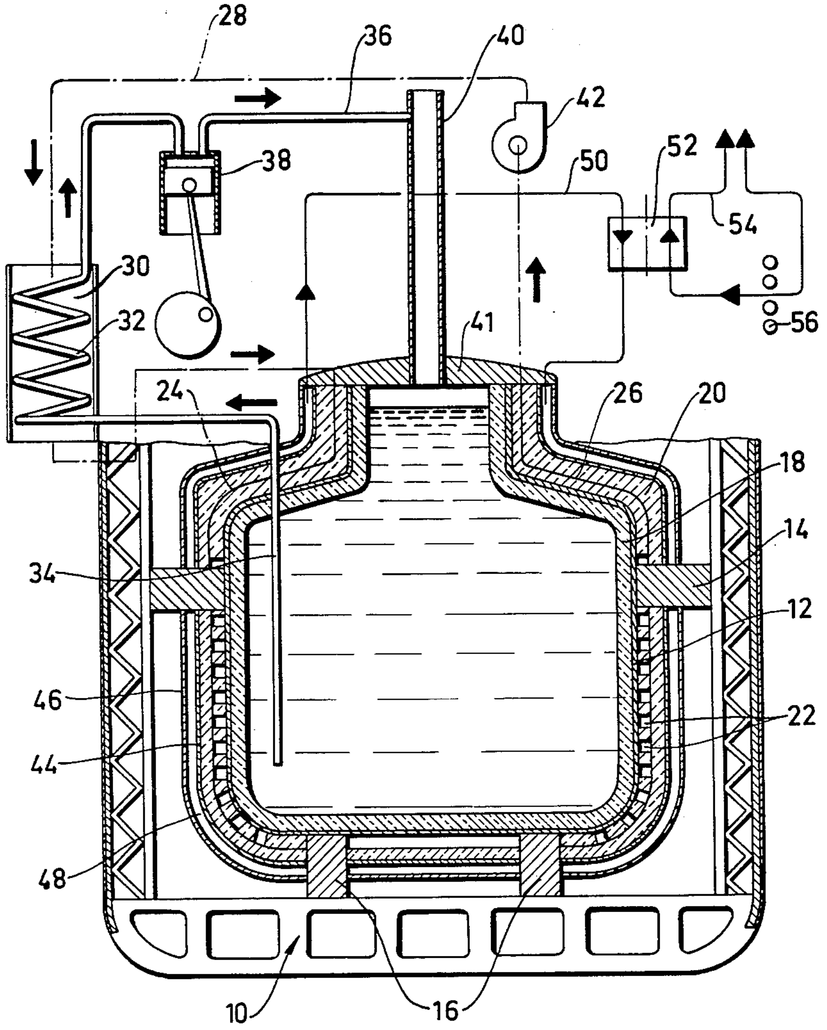
INVENTOR.
Hans H. R. Niemann
BY Jarvis C. Marble
ATTORNEY United States Patent Office 3,110,156

Patented Nov. 12, 1963

1

2

3,110,156

INSULATION OF CONTAINERS FOR THE STORAGE OF LIQUIDS WHICH BOIL AT ATMOSPHERIC OR SLIGHTLY SUPERATMOSPHERIC PRESSURE

Hans Heinrich Richard Niemann, Hamburg, Germany, assignor to Minikay A.G., Zurich, Switzerland, a corporation of Switzerland Filed June 29, 1961, Ser. No. 120,673
Claims priority, application Sweden July 15, 1960
4 Claims. (Cl. 62—45)

This invention relates to containers which serve for the storage or shipping of liquids which boil at atmospheric pressure or at slightly superatmospheric pressure. More particularly this invention is concerned with liquids which under atmospheric pressure boil at very low temperatures as is the case with a mixture of methane and ethane.

To keep the losses due to evaporation within economical limits and to be able to employ metals which are brittle at these low temperatures, such as non-alloyed steel, for example, for the support of the containers and for ships on landcraft on which the containers are transported, it is of essential importance that the containers have an efficient insulation.

If the containers are insulated in known manner by applying an insulating material on the external side of the container wall, a vapor pressure drop from the free atmosphere towards the container wall takes place which pressure drop within a relatively short time causes the insulation to become saturated with moisture, ice crystals being formed therein and the insulation becoming destroyed. The moisture penetrating into the insulation from the surrounding atmosphere due to the pressure drop collects against the container wall where the precipitation of ice begins. The formation of ice then continues outwards through the entire insulation.

It is known to minimize the damage due to moisture by forming channels in the insulating material the interior of which is in diffusion connection with the material and through which a stream of dry air is conducted. This air, due to its lower vapor pressure, picks up the water vapor diffusing into the insulation, conveys it to a dehumidifier and can in this way be used again for removal of moisture from the insulation. Utilization of this method known per se in connection with insulation of containers for materials such as methane and ethane meets with special difficulties, since the water vapor content at the low boiling temperatures of these materials is so low per unit of weight of the air as to require enormous volumes of air for removal of the moisture diffusing into the insulation. These large volumes of air require dimensions of the channels which are impracticable to realize.

It is also know to insulate such containers internally, in which case it is inevitable that the stored liquid penetrates into the insulation and is evaporated within a warmer zone thereof for which reason some portion of the insulation always becomes inactive. The stored liquid, however, cannot reach the outer container wall, because it must necessarily have been evaporated earlier and under atmospheric pressure the liquid phase is not stable adjacent the container wall. However, the insulation of such a container from inside entails a considerable risk of explosion due to evaporation and to the leaking out of liquid into inevitable slits and the like in the insulation layer.

One main object of the invention is to provide a storage container having insulation of substantially constant efficiency, the insulation being kept dry in a reliable manner.

According to one main feature of the present invention a container for the storage or shipping of liquids which boil at atmospheric or slightly superatmospheric pressure comprises an insulating layer provided both externally and internally of the wall of the container, channels formed in the external insulating layer preferably located adjacent to the container wall, the interior of the channels being in diffusing connection with the external insulating layer, means to pass a stream of gas through the channels, a dehumidifier to dry the gas by means of heat exchange with the liquid in the container, the internal insulating layer being adapted to keep the temperature of the container wall above the temperature of the gas stream leaving the dehumidifying device.

Another object of the invention is to provide a method of storing or shipping liquids which boil at atmospheric or slightly superatmospheric pressure which is easy to control and highly reliable in operation and which substantially comprises the steps of disposing the liquid in a container the wall of which has an internal and external layer of insulation, forming channels in the external layer of insulation preferably located adjacent to the container wall, the interior of the channels being in diffusion connection with the external insulating layer, passing a stream of gas through the channels, drying the gas by passing it through a dehumidifier, the internal insulating layer being adapted to keep the temperature of the container wall above the temperature of the gas stream leaving the dehumidifying device.

It will be understood that in the present invention the rise of temperature created by the internal insulation in the direction towards the container wall will create a sufficiently great pressure difference to permit removal of the moisture diffusing in by means of a moderate quantity of re-cycled air and thus to ensure that the insulating capacity is maintained. It is thus a further object of the present invention to provide means attaining the effect that the stored liquid itself is capable of effecting the dehumidification of the insulation.

The external insulation may be covered in a manner highly impervious to diffusion by two walls spaced apart to form between themselves a hollow space surrounding the insulation through which a stream of dry gas separate from the gas stream through the channels in the external insulation, is re-cycled via a dehydrator. By this means the vapor pressure drop within the external insulation is reduced. The quantity of air required for removal of the moisture from the insulation is substantially proportional to the vapor pressure drop in the same manner as it is proportional to the diffusion resistance in a surrounding cover.

Further objects and advantages of the invention will become apparent from the following description considered in connection with the accompanying diagrammatic cross-sectional drawing of a container according to the invention mounted in the hull of a ship, which drawing forms part of this specification.

In the drawing, the hull of the ship is indicated generally at 10 and a container 12 of metal is supported within the hull by means of spacers or supports 14, 16 of a relatively poor heat-conducting material. The container 12 is provided with an internal insulation layer 18 which is in direct contact with the low-boiling liquid stored in the contaner, such as a mixture of methane and ethane. The boiling point of said mixture at atmospheric pressure is about —162° C. Externally of the container a second insulation layer 20 is mounted. The two insulation layers are of a type known per se and may comprise cork or other fibrous material, plastic foam, mineral wool or the like. The external layer 20 is preferably thicker and thus has a greater insulating capacity than the internal layer 18 which is in direct contact with the cold liquid.

In the external insulating layer 20 channels 22 are formed which are preferably located immediately adjacent to the container wall 12 and the interior of which are in diffusion communication with the insulation. The channels 22 are preferably in parallel with one another and may extend horizontally or in the form of a helix around the periphery of the container. The channels 22 are in communication with a common distributing channel 24 and a common collecting channel 26. These channels 24 and 26 in turn form part of a closed circuit 28 which contains a dehumidifier 30. The dehumidifier operates according to the principle that the drying agent is cooled down so that moisture present therein is condensed. As a refrigerant the low-boiling point liquid is used, possibly in vapor state. In the embodiment the dehumidifier is constructed with a coil 32 which is in communication through a conduit 34 with the interior of the container at a place below the level of the liquid therein. The liquid is caused to evaporate within the coil 32 and the vapors escape through a conduit 36 within which may be provided a suction pump 38 or the like and which may open into a chimney 40. Through the chimney 40 which projects from an insulated cover 41 vapors evaporating from the stored liquid are removed. These vapors are then burnt, for example, or the liquid may be recovered by cooling the vapors. A gaseous fluid is pumped by means of pump 42 through the circuit 28 over the dehumidifier 30 where it is cooled down to approximately the temperature of the stored liquid and thereupon flows through the distributing channel 24 to the channels 22 to return through the collecting channel 26 to the dehumidifier.

Mounted externally of the external insulation 20 is a casing with double walls 44, 46 which are made as impermeable as possible. The walls are spaced apart and between them is a space 48 which thus surrounds the external insulation 20 and the container 12. The space 48 forms part of a closed circuit completely separate from the circulation circuit mentioned above and indicated by the line 50. A dehydrator 52 which is of the adsorptive or absorptive type is provided in the circuit 50 and this preferably comprises a rotatable wheel containing a hygroscopic mass with fine channels penetrating therethrough from end to end. The dehydrator 52 has inlets and outlets which partly are connected with the circuit 50 and partly with another circuit 54 into which is inserted a heater 56. The circuit 54 may communicate at both ends with the atmosphere. The dehydrator 52 is thus of the regenerative type so that moisture, which is absorbed by the mass thereof when gaseous fluid present in the circuit 50 passes through the mass, is expelled from the mass when this comes into contact with heated regenerative air flowing in the circuit 54.

The two gaseous fluids re-cycled in the two circuits may be constituted by air or an inert gas or a non-combustible gas such as nitrogen. Such a gas therefore also serves as a fire protection because the stored liquids are often highly explosive. It is a condition for such an inert gas that it should be in a gaseous state at the temperatures which it meets during its circulation. The gas present in the outer cycle may be carbon dioxide.

The plant operates in the following manner. Due to the internal insulation layer 18 the container wall 12 will adjust itself to a temperature which is higher than that of the stored liquid. Thus if the boiling point of the stored liquid lies at −162° C., the insulation may provide for a rise in temperature of about 35° or more on the wall 12. In the dehumidifier 30 the gas cycled in the circuit 28 is cooled to a lower temperature which thus may be only one degree or less above the temperature of the low-boiling liquid. Simultaneously, the moisture content of the gas is reduced to a partial pressure corresponding to this temperature. The gas then enters the external insulation 20 through the distributing channel 24 and passes through the channels 22 into diffusion contact with the insulating material. Although the insulation 20 is surrounded by two casing walls 44, 46 these can never be made absolutely impermeable for which reason a diffusion of moisture into the insulating layer 20 proceeds continuously. Due to the feature that the internal insulation 18 creates a temperature difference between the external face of the container wall 12 or a zone of the insulation 20 adjacent the channels 22 and the entering drying gas this latter attains the capacity of picking up suffiicent moisture to maintain a balance in the system. With moderate quantities of circulating gas the penetrating moisture will thus be effectively removed under a state of equilibrium by the circulating gas. This is regenerated by being returned in the circuit 28 to the dehumidifier 30.

The two casing walls 44, 46, even if not absolutely impermeable, serve also as a diffusion barrier so that the quantity of penetrating moisture is kept at a low value. At the same time the gas re-cycled in the space 48 and the circuit 50 provide for part of the moisture penetrating through the outer casing wall 46 to be removed or carried away to the dehydrator 52 which in turn discharges the moisture into the atmosphere through the regenerating circuit 54. In the space 48 the temperature naturally is higher than in the channel system 22 for which reason the cycle is capable of operating with substantially higher temperatures of the drying gas and greater drying capacity per unit volume as a result thereof.

While one more or less specific embodiment of the invention has been shown and described, it is to be understood, that this is for purpose of illustration only, and that the invention is not to be limited thereby, but its scope is to be determined by the appended claims.

What I claim is:

1. An insulated container for the storage or shipping of liquids which boil at atmospheric or slightly superatmospheric pressure, said container comprising a single rigid wall, an inner insulating layer on the internal surface of said wall, an outer insulating layer on the external surface of said wall, channels formed in said outer insulating layer, the interior of said channels being entirely isolated from the interior of said container and in diffusion communication with said outer insulating layer, means to circulate a gas through said channels for absorbing moisture penetrating into said outer insulating layer from the ambient atmosphere, a heat exchange type dehumidifier, means connecting with said dehumidifier and said channels and means to circulate liquid from said container through said dehumidifier to cool said gas and dry the same, said inner insulating layer serving to maintain the temperature of said wall above the temperature of the gas leaving said dehumidifier and recirculating through said channels.

2. An insulated container as defined in claim 1, in which said channels are disposed adjacent said wall.

3. An insulated container as defined in claim 1, in which said outer insulating layer is enclosed by a casing having spaced walls to provide a passage entirely isolated from said channels and means to circulate a gas through said passage and through a second dehydrater.

4. An insulated container as defined in claim 3, in which said second dehydrater is of the sorptive type.

References Cited in the file of this patent

UNITED STATES PATENTS

| | | |
|---|---|---|
| 2,485,630 | Munters | Oct. 25, 1949 |
| 2,650,478 | Brown | Sept. 1, 1953 |
| 2,922,287 | Rae | Jan. 26, 1960 |
| 2,928,254 | Rae | Mar. 15, 1960 |
| 2,999,366 | La Fave et al. | Sept. 12, 1961 |